United States Patent [19]
Honigsbaum

[11] Patent Number: 5,990,822
[45] Date of Patent: Nov. 23, 1999

[54] PROCESS AND APPARATUS FOR FINDING STEALTHCRAFT

[76] Inventor: Richard F. Honigsbaum, A-21 Barry Gardens, 245 Passaic Ave., Passaic, N.J. 07055

[21] Appl. No.: 07/714,328

[22] Filed: Jun. 11, 1991

Related U.S. Application Data

[63] Continuation of application No. 07/338,975, Apr. 14, 1989, abandoned.

[51] Int. Cl.[6] .................................................. G01S 13/56
[52] U.S. Cl. ................................ 342/90; 342/16; 342/13; 342/195; 342/162
[58] Field of Search .............................. 342/60, 159, 160, 342/162, 16, 27, 54, 59, 13, 96, 98, 99, 189, 195, 197

[56] References Cited

U.S. PATENT DOCUMENTS

| | | | |
|---|---|---|---|
| 3,631,434 | 12/1971 | Schwartz | 340/228 |
| 3,736,430 | 5/1973 | Kaminskas | 250/395 |
| 3,885,237 | 5/1975 | Kirkpatrick | 342/26 |
| 4,102,572 | 7/1978 | O'Meara | 356/5 |
| 4,187,501 | 2/1980 | Olesch et al. | 340/554 |
| 4,390,785 | 6/1983 | Faulhaber et al. | 250/330 |
| 4,458,240 | 7/1984 | Rittenbach et al. | 340/552 |
| 4,497,065 | 1/1985 | Tisdale et al. | 328/1 |
| 4,521,861 | 6/1985 | Logan et al. | 364/517 |
| 4,606,848 | 8/1986 | Bond | 252/511 |
| 4,633,261 | 12/1986 | Kosaka et al. | 342/430 |
| 4,635,203 | 1/1987 | Merchant | 364/458 |
| 4,692,618 | 9/1987 | Klatt | 250/330 |
| 4,707,735 | 11/1987 | Busby | 358/108 |
| 4,801,940 | 1/1989 | Ma et al. | 342/359 |
| 4,803,489 | 2/1989 | Giori | 342/192 |
| 4,806,936 | 2/1989 | Williams et al. | 342/126 |
| 4,811,308 | 3/1989 | Michel | 367/136 |
| 4,821,337 | 4/1989 | Alm | 382/58 |
| 4,829,306 | 5/1989 | Gjessing et al. | 342/159 |
| 4,847,817 | 7/1989 | Au et al. | 367/135 |
| 4,893,182 | 1/1990 | Gautraud et al. | 358/105 |
| 4,910,520 | 3/1990 | Rosen et al. | 342/25 |
| 4,914,734 | 4/1990 | Love et al. | 342/64 |
| 4,929,834 | 5/1990 | Liebson | 250/352 |
| 4,933,678 | 6/1990 | Tennyson | 342/176 |
| 4,953,972 | 9/1990 | Zuk | 356/4 |
| 4,958,224 | 9/1990 | Lepore et al. | 358/126 |
| 5,025,143 | 6/1991 | Dayhoff | 250/203.3 |
| 5,027,413 | 6/1991 | Barnard | 382/1 |
| 5,062,056 | 10/1991 | Lo et al. | 364/516 |
| 5,073,782 | 12/1991 | Huguenin et al. | 342/179 |
| 5,086,396 | 2/1992 | Waruszewski, Jr. | 364/454 |
| 5,103,484 | 4/1992 | Stafford et al. | 382/1 |
| 5,109,425 | 4/1992 | Lawton | 382/1 |
| 5,109,435 | 4/1992 | Lo et al. | 382/48 |
| 5,134,472 | 7/1992 | Abe | 358/105 |
| 5,150,426 | 9/1992 | Banh et al. | 382/48 |
| 5,175,802 | 12/1992 | Crookshanks | 395/100 |
| 5,264,930 | 11/1993 | Florence et al. | 358/113 |

OTHER PUBLICATIONS

Introduction to Radar Systems, Skolnik, McGraw–Hill Book Co., (1980) pp. 26, 31, 33, 62–63, 101, 232, 264, 401, 470–473, 552–553.

*Primary Examiner*—John B. Sotomayor
*Attorney, Agent, or Firm*—Cohen, Pontani, Lieberman & Pavane

[57] ABSTRACT

Stealthcraft are detected by illuminating backgrounds with narrow radar or sonar beams and monitoring this background illumination for the changes that result when these beams are absorbed by such targets, and are ranged by triangulation using two such beams.

15 Claims, 5 Drawing Sheets

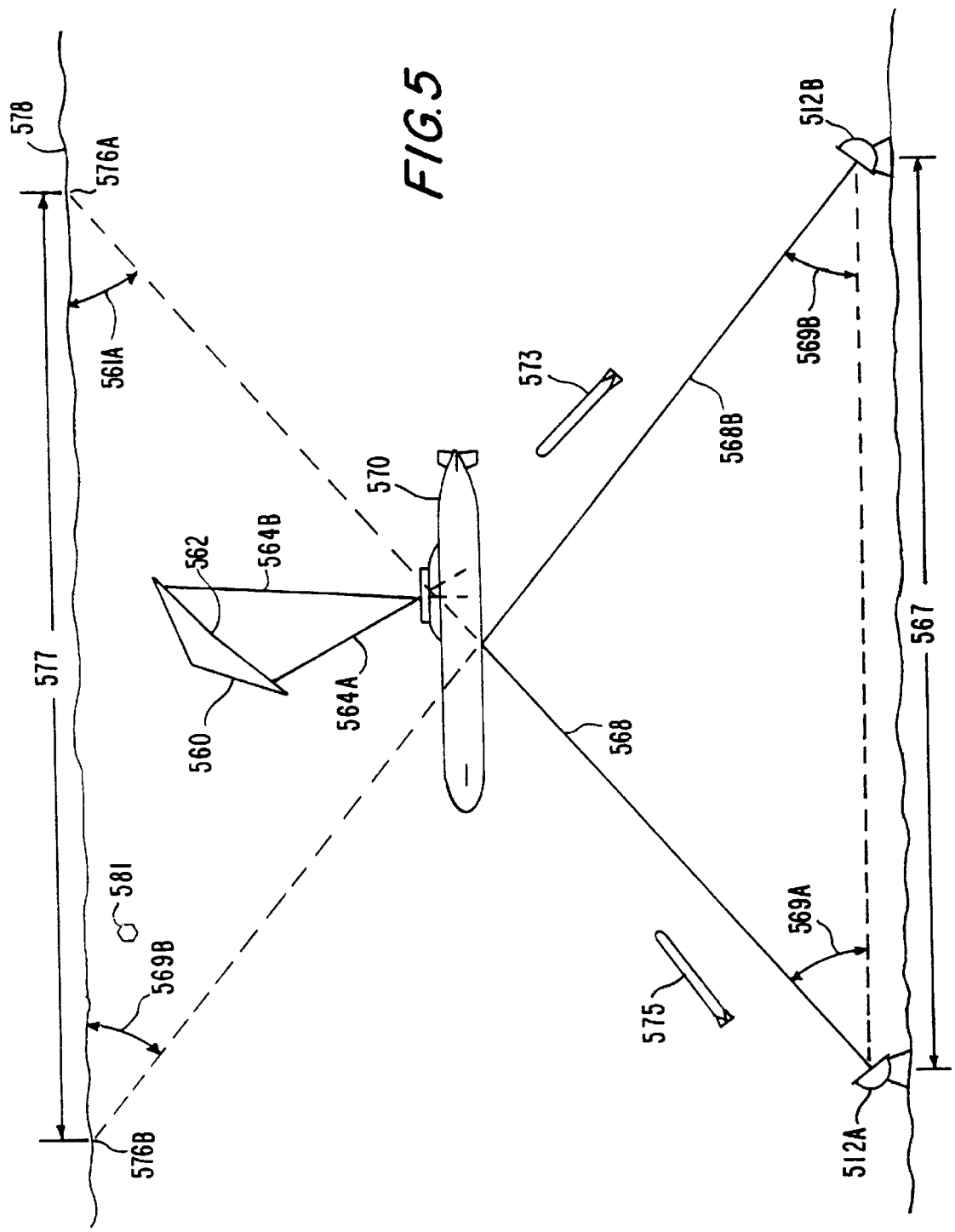

PROCESS AND APPARATUS FOR FINDING STEALTHCRAFT

This is a continuation of U.S. application Ser. No. 07/338,975, filed Apr. 14, 1989 now abandoned.

BACKGROUND OF THE INVENTION

1. Field of the Invention

This invention relates to radar and sonar and more particularly to finding both conventional and stealth-modified targets by these means.

2. Prior Art

Radar and sonar equipment and techniques are well developed and widely used both militarily and otherwise, and the literature on these subjects abounds. Skolnik, for example, lists over one thousand references in his *Introduction to Radar Systems*, and his *Radar Handbook* covers the subject in even more detail.

Military and non-military applications differ, however, because enemy targets are attacked when detected and so best survive when they are hard to find, and are modified to make them so, while non-military targets survive best when they are detected before there is any risk of collision, and are modified accordingly. While the most refined techniques for making military targets stealthy and the techniques for finding them despite stealth presumably have not been made public, it is clear that, at least with respect to detection of stealthcraft with prior art radars or sonars, this task becomes more difficult when these targets are absorbers rather than reflectors of the beams transmitted to find them, and this task has been made so, at least in part, by the conventional techniques used to suppress background returns.

SUMMARY OF THE INVENTION

According to the present invention, I have developed radar and sonar systems that are indifferent to whether the objects to be found are absorbers, reflectors or refractors of the beams transmitted to detect them.

According to one preferred embodiment of the invention, a dual-beam radar that can illuminate a reflective background such as earth, the sea, clouds, or the ionosphere is fitted with narrow transmit-beam antennas to radar-illuminate that background, receivers that monitor background illumination, processors responsive to local change in that illumination, and a display that highlights those changes. Thus, when a beam from this radar is absorbed, reflected, or refracted by a target, the resulting dark patch in the background illumination pattern is displayed as a target.

In this dual-beam embodiment, targets are ranged by triangulation, and one important feature of this invention is a search process in which one beam follows conventional search patterns, and the second intersects with and scans the useful length of the first.

Another important feature of this invention is the way in which target-produced background illumination changes are distinguished from clutter. With conventional radars, the reflections from targets are the returns of interest and the returns from backgrounds are considered clutter, so that stealth-modified targets can hide in chaff or operate in such a way that their returns blend in with those from backgrounds, and so avoid detection. In this invention, however, the returns of interest are distinguished from clutter by the order in which they were transmitted, so that these target-masking techniques are ineffective here.

Yet another important feature of the dual-beam embodiment of this invention is a "false alarm" reduction process that does not compromise sensitivity.

This invention is also served by single beam embodiments, and in one such preferred embodiment, a transmitter with a broader beam antenna is dispatched to the far side of the target, the receiver tracking the silhouette of the target in that beam.

These and other features, modifications, and advantages of the radar systems of the present invention are applicable to sonar systems as well, and both radar and sonar embodiments of the present invention will be more fully described with reference to the annexed drawings of the presently preferred embodiments and some of the applications thereof.

BRIEF DESCRIPTION OF THE DRAWINGS

In the drawings:

FIG. 5 is a pictorial representation of some of the sonar applications of the present invention.

DETAILED DESCRIPTION OF THE PREFERRED EMBODIMENTS

Figure 1:
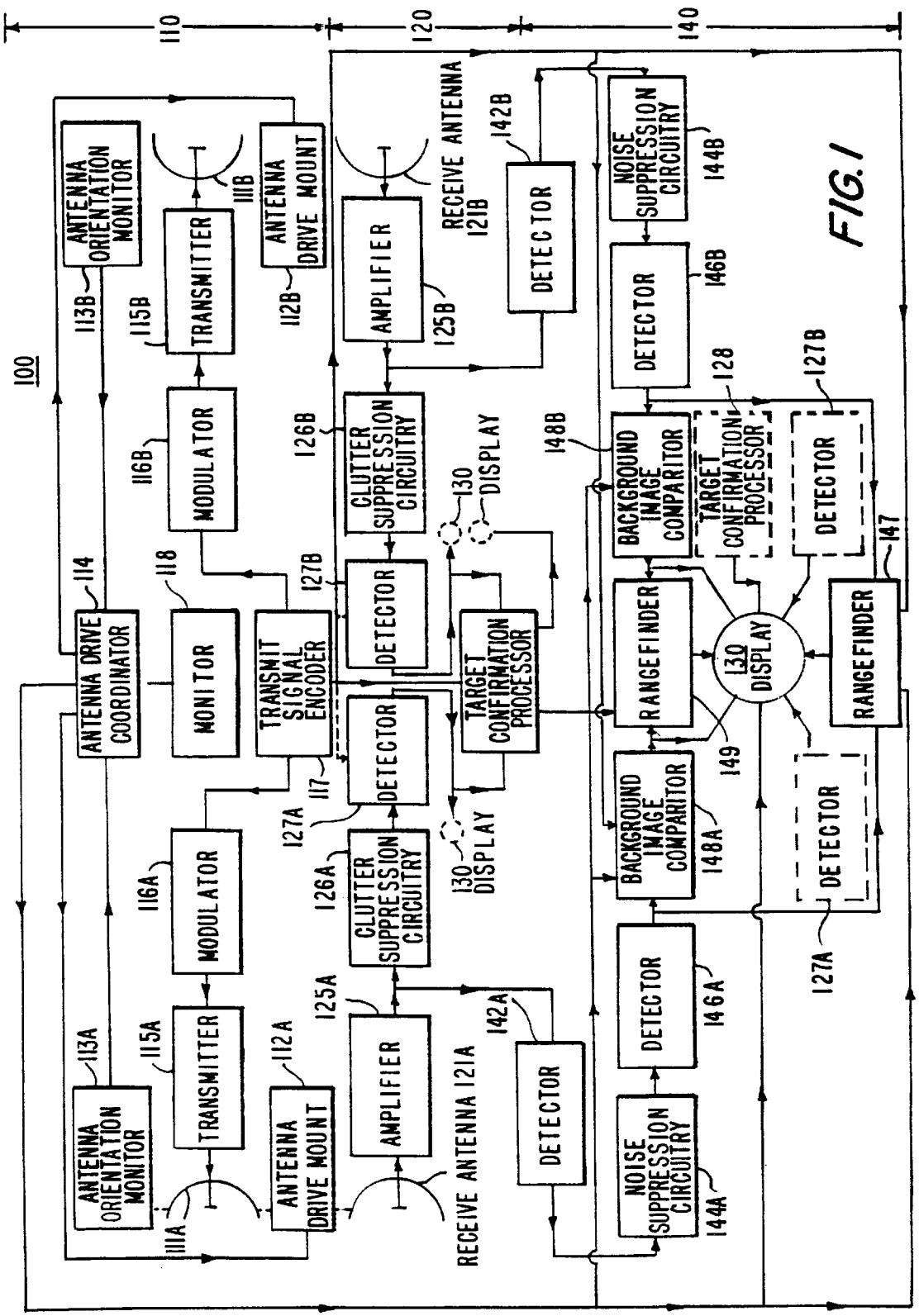
FIG. 1 is a block diagram of the preferred dual-beam radars and sonars in accordance with the present invention.

Referring initially to FIG. 1 in the drawings, the embodiment of the block diagram, generally designated 100, is the preferred radar or sonar embodiment of this invention, having a transmit portion 110, a conventional receive portion 120, a display 130, and a stealthfinder portion 140. As is clear from the drawing, each of the portions 110, 120, and 140 is dual, so that there are, using a radar embodiment as example, two conventional narrow beam transmit antennas 111A and 111B, each driven by its own conventional transmitter 115A or 115B, each transmitter being modulated by its own conventional modulator 116A and 116B respectively. The modulators 116A and 116B are driven by transmit signal encoder 117, the purpose of which will be explained in greater detail later herein.

Each transmit antenna 111A and 111B has a drive mount that it shares with a conventional receive antenna, so that transmit antenna 111A and receive antenna 121A share drive mount 112A as suggested by the dashed lines connecting these elements, and transmit antenna 111B and receive antenna 121B share drive mount 112B as confirmed by the dashed lines connecting those elements.

Antenna drive mounts 112A and 112B orient their respective antennas in accordance with signals from antenna drive coordinator 114, the actual orientation of the respective transmit antennas 111A and 111B being reported to antenna drive coordinator 114 by antenna orientation monitors 113A and 113B respectively, so that errors due to wind, drive train irregularities, etc., can be eliminated.

The signals transmitted by transmit antenna 111A that are reflected by targets, backgrounds, clutter, chaff, etc., are collected by receive antenna 121A, amplified by conventional low noise amplifier 125A, processed in a conventional way to change from RF to IF frequency and to suppress noise and clutter by first detector and noise and clutter suppression circuitry 126A which, if the radar were groundbased or mounted on a slow-moving platform such as a ship or a blimp, and the targets were faster-moving aircraft, could be Doppler circuitry. These signals are then processed by second detector 127A, and made available for presentation by display 130.

Doppler processing is, however, inappropriate for radar moving at approximately stealthcraft velocity for obvious reasons, and matched filters are better noise suppressors for such applications. Where Doppler processing is inappropriate, background clutter can be eliminated by circuitry (corresponding to the dotted paths in FIG. 1) that introduces a replica of the output from transmit signal encoder 117 into block 127A, where it is stored temporarily for purposes of comparison with corresponding portions of the signals received. Because flying targets are closer to transmit antenna 111A than the patch of background behind them, the signals returned from these targets will clearly be out of sequence (early) with respect to those from the background, and background clutter is eliminated by deleting in-sequence returns from the signals made available for further processing or display. (For purposes of this invention, "in-sequence" returns are those that, allowing for lost pulses, are returned in the sequence that would have been expected had the background been the only reflector, and sequence recognition is facilitated by transmit signal encoder 117, the output of which sequence-codes transmissions, say by changing the length, phase, spacing or grouping of pulses, or by modulating the carrier with respect to amplitude, frequency, etc.)

The returns from the signals transmitted by transmit antenna 111B and collected by receive antenna 121B are similarly processed by the corresponding blocks bearing the "B" suffix, so that the target-returned portions of these signals, which are the outputs of blocks 127A and 127B, can be made available for further processing and display. The signals from blocks 127A and 127B are also fed to conventional target confirmation processor 128, as are those from transmit signal encoder 117, antenna drive coordinator 114, and, via block 114, also those from searchcraft monitor 118.

In conventional single-beam radars and in the "A" suffixed and "B" suffixed portions of the FIG. 1 embodiment of this invention as well, noise can be mistaken for target returns, and this "false alarm" problem, familiar from the literature and explained in Skolnik, has been previously addressed by raising threshold levels and/or by ignoring fewer than some arbitrary number of "hits". While the "false alarm" rate is reduced by these techniques, so too is the ability to find small and/or distant targets. In the embodiment of FIG. 1, however, the "false alarm" problem is addressed without the compromises of the prior art.

In this invention, the preferred dual-beam search pattern is one in which both beams intersect, and in which one beam, say that from antenna 111B, scans the length of the other, that from antenna 111A (excepting, of course, an arbitrarily small portion of the beam from antenna 111A nearest that antenna). For this search pattern, the the point of intersection is known a priori from the orientation of the antennas, and in the preferred embodiment the transmitted beams are modulated in accordance with instructions from transmit signal encoder 117 not only to accommodate elimination of background returns as explained earlier herein, but also to identify returns that result when the beams impinge upon a target at a point of intersection. Conventional target confirmation processor, block 128, confirms targets on the basis of corresponding returns from both beams, and because the probability of "false alarms" on this basis is low, sensitivity and its advantages with respect to target size and range can be preserved.

In the embodiment of FIG. 1, block 128 is fed information from blocks 114 and 117, and stores that information long enough to compare it with outputs of blocks 127A and 127B to confirm that these outputs are from returns from a point of intersection of the beams and thus a (conventional) target. Returns that do not correspond to points of intersection of the beams can either be assumed to be "false alarms", or be used to refine the search pattern.

This confirmation process requires not only that returns from each of the beams is correctly identified by the corresponding portion of the receiver, but also that background patches simultaneously illuminated by both beams are not mistaken for targets. The first of these problems is preferably addressed by operating each transmitter at a distinguishably different frequency, and the second by ignoring in block 128 the in-sequence returns that were not deleted earlier (by Doppler processing, or by ignoring in-sequence returns in blocks 127A and 127B as explained).

The outputs of low noise amplifiers 125A and 125B are also fed to stealthcraft detection and ranging portion 140 where, with reference to the "A" suffixed blocks, the output of low noise amplifier 125A is changed in frequency by RF-to-IF first detector 142A, cleaned up with respect to noise by noise suppression circuitry 144A which is, for example, a matched filter, and converted to a form suitable for further processing and display by second detector 146A. Alternately, if block 126A processes signals exactly as described for blocks 142A, and 144A, the output of block 126A can be fed directly to block 146A, and blocks 142A and 144A omitted. In either case, output from the second detector is fed to background image comparitor 148A. The signals from low noise amplifier 125B are, of course, similarly processed by the "B" suffixed blocks.

The frequencies of interest for the radars and sonars that detect and range stealthcraft in accordance with this invention are those for which the respective backgrounds, earth, water, water vapor (clouds), the ionosphere, sea bottoms, etc. are reflective. When the radar or sonar beams that illuminate these backgrounds also illuminate targets, these beams are at least partially absorbed, reflected, or refracted and, for beams narrow enough or targets large enough, dark patches corresponding to the positions of these targets will appear in the background reflection pattern. Because these dark patches will appear whether the transmitted beams are absorbed, reflected, or refracted by targets, it becomes a matter of indifference whether these targets are stealth-modified or conventional, provided, of course, that reflections from targets are not confused with those coming from the background.

These dark patches are highlighted for further processing or display by background image processors 148A and 148B that are, at least in part, digital image processing computers like those in conventional airborne mapping equipment such as digital synthetic aperture radars (SAR) that produce maps of the background that can be processed further, or made available for display "as is". Further processing is preferred here, however, because these dark patches may be hard to find in the "raw" images.

The first step in this further processing is the elimination of the returns from targets, chaff, etc. that, because they arrive out of sequence (early) with respect to returns from backgrounds, can be identified by comparing suitably delayed replicas of the signals transmitted with those returned. In the embodiment of FIG. 1, transmit signal encoder 117 information is supplied to blocks 148A and 148B, where it is stored until the returns processed by blocks 146A and 146B can be compared with replicas of those transmitted, and the parts of the block 148A and 148B images due to out-of-sequence returns removed. These "sanitized" background images are then compared on a sequential basis so that the common features of consecutive images can be suppressed, and the target-produced dark patches highlighted for further processing or display. (While image processing to highlight changes in successive images is not normally a part of conventional mapping radar, such processing and the computer programs needed to do so are known from the art of deep space exploration, where transmissions from imaging sattelites are, for practical reasons, limited to differences from previously transmitted images.) In practicing this invention, the basis for clutter removal, at least with respect to stealthcraft detection, is distinguishing between in-sequence and out-of-sequence returns, and is preferably facilitated by feeding information from searchcraft orientation monitor 118 to antenna drive coordinator 114 so that beams can follow prescribed search patterns despite pitch, roll, or yaw of the searchcraft.

The output of blocks 148A and 148B intended for further processing is that in which dark patches are highlighted, and this output, as well as the "raw" or "sanitized" images from these blocks, is fed to display 130 by switching devices that are familiar from the prior art and are assumed to be part of the embodiment, but have been omitted from the drawing.

Stealthcraft are ranged and their detection confirmed by blocks 147 and 149 of FIG. 1, but the process is best explained with reference first to FIG. 2, in which a searchcraft 260 is shown finding and ranging a first stealthcraft 270 below, and also a second stealthcraft 275 above.

With respect to stealthcraft 270 below, transmit antenna 211A, receive antenna 221A, and their common drive mount 212A (corresponding to 111A, 121A, and 112A of FIG. 1) are mounted behind beam-transparent shield 261A which, for radar, is a radome. Similarly, transmit antenna 211B, receive antenna 221B, and their common drive mount 212B are mounted behind radome 261B. Baseline 262 is the line connecting the effective pivot point of transmit antenna 211A with that of transmit antenna 211B. (These pivot points are the actual pivot points for antennas that are mechanically steered, and their effective equivalents for antennas that are purely electronically or both electronically and mechanically steered.) Angle 263 is the angle that baseline 262 makes with respect to a parallel to the horizon in the plane of the triangles that, as will be explained, are used to calculate range.

Recalling that in the preferred search mode one transmitted beam, say beam 264B from transmit antenna 211B, sweeps the length of and intersects with beam 264A from transmit antenna 211A, these beams are shown intersecting at and being absorbed by stealthcraft 270, so that when these beams are so oriented, beam 264B leaves one dark patch 271B in the radar illumination pattern of sea surface 273, beam 264A another, 271A, each dark patch being highlighted by the corresponding background image comparitor 148A or 148B of FIG. 1.

The transmitted beams intersect at the stealthcraft as shown, and the portion of these beams above stealthcraft 270 plus baseline 262 form one triangle, while the extension of these beams from their point of intersection to the sea surface plus background baseline 272, the distance between dark patches 271A and 271B, form another. These triangles and the known altitude of the searchcraft are used to calculate the range, bearing, and altitude of the stealth-modified target 270.

For the first triangle, the angles 265A and 265B that the beams 264A and 264B make with baseline 262 are known because they are set by antenna drive coordinator 114, so that the distance from the target to each pivot point as well as the height of the searchcraft with respect to the target can be found by trigonometry. The target altitude is found by subtracting the height of the searchcraft with respect to the target from the altitude of the searchcraft itself, and the target bearing directly from angles 265A and 265B.

Target range and altitude can also be calculated from the second triangle, recognizing that angle 274B is the difference between angles 265B and 263, that angle 274A is the sum of angles 265A and 263, and that background baseline 272 can be calculated from angles 265A and 265B and the altitude and orientation of the searchcraft. In the preferred embodiment, antenna baseline rangefinder 147 of FIG. 1 calculates target range from the triangle that includes baseline 262 of FIG. 2.

Figure 2:
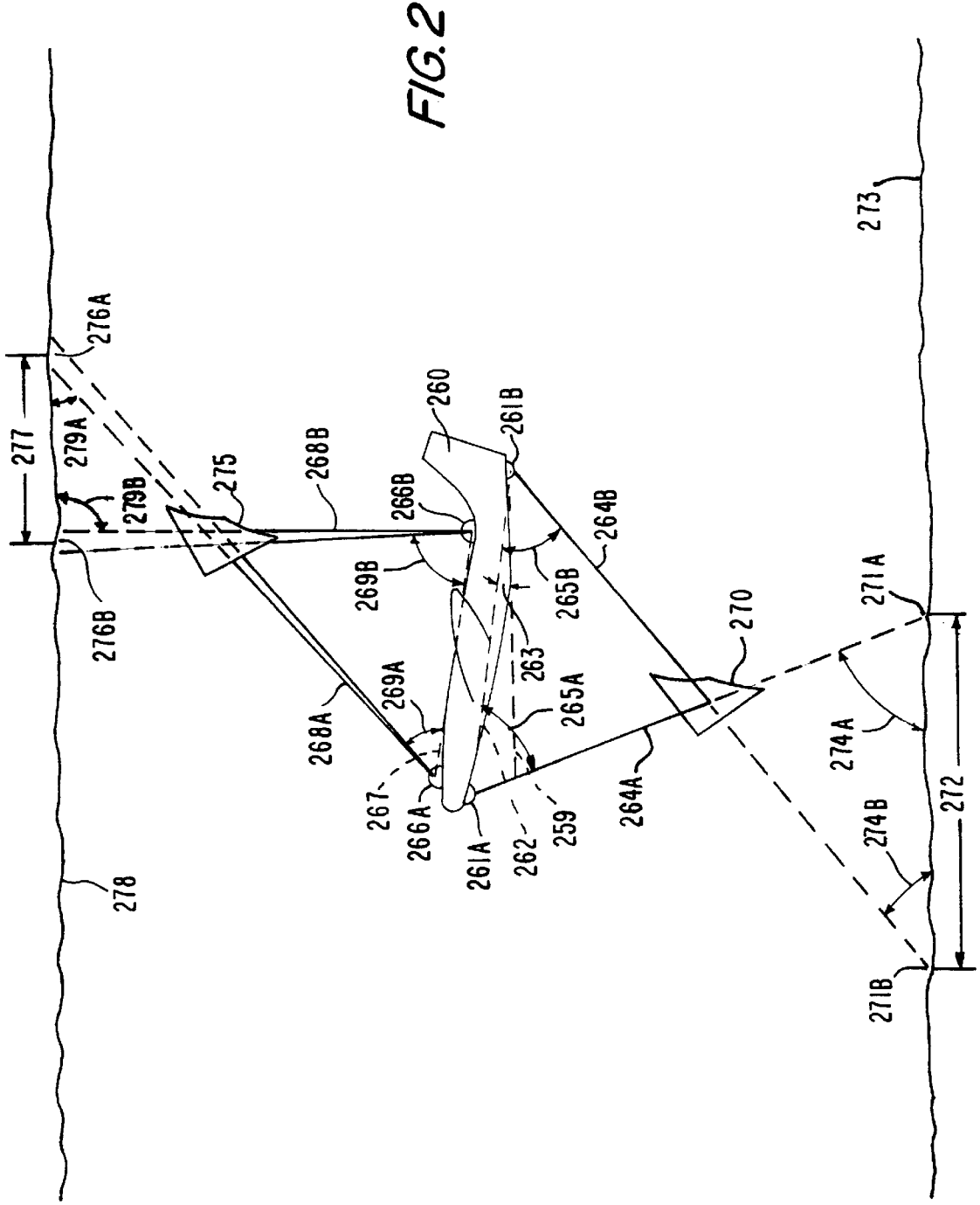
FIG. 2 is a pictorial representation of a searchcraft using the radar embodiment of FIG. 1 to detect and range stealthcraft.

Returning now to FIG. 1, antenna drive coordinator 114 feeds not only antenna orientation data corresponding to the FIG. 2 angles 265A, 265B to antenna baseline rangefinder 147, but also the FIG. 2 angle 263 and the searchcraft altitude, the last-mentioned angle as well as the searchcraft altitude having been supplied to block 114 by searchcraft monitor 118.

Antenna baseline rangefinder 147, a computer (or portion thereof), also receives and temporarily stores replicas of signals from transmit signal encoder 117, compares them with those from detectors 146A and 146B, and, for reasons that have been explained earlier herein, suppresses those that are out of sequence. It also looks for a loss of signal, say because transmit beam 264A of FIG. 2 has been absorbed by stealthcraft 270, "memorizes" the value of angle 265A supplied by antenna drive coordinator 114 corresponding to that loss of signal, looks for the loss of signal from transmit beam 264B that corresponds to a point of intersection of the beams and that confirms target detection, "memorizes" the angle 265B, and calculates the range, bearing, and altitude of the target as explained, making this information available to display 130, and then resets to repeat the process. Recalling that in the preferred scan pattern the beams intersect, and that the second beam scans the length of the first, the second beam must be interrupted within a time corresponding to one full scan of the first to confirm a target. If there is no confirmation during that time, the computer is reset, and the "memorized" data for the first dark patch is either used as a basis for refining the search pattern or ignored.

Searchcraft 260 of FIG. 2 is also shown finding and ranging a stealthcraft 275 above, and now familiar are beam-transparent shields 266A and 266B, beams 268A and 268B making angles 269A and 269B with baseline 267 respectively, the interruptions of these beams resulting in dark patches 276A and 276B on reflective background 278 that, depending upon operating frequencies and conditions, is the ionosphere, clouds, a man-made reflector such as chaff, etc. Also familiar are the angles 279A and 279B that the extensions of beams 268A and 268B make with background baseline 277. Here, however, the beams are shown having a measurable width, so that for targets small enough, or at ranges great enough, beams will be wide enough to illuminate backgrounds and compromise detection despite absorption of part of the beam by the stealthcraft.

Skolnik mentions a lowest practical beam angle of 0.4 degrees for conventional radar frequencies and antennas, and with such equipment stealth-modified flightcraft can be reliably detected at distances no greater than a few miles.

While this range limit can be addressed by increasing the number of searchcraft and decreasing the spacing between them, the preferred approach is that of changing frequencies from those of conventional radar to those at which narrower beam antennas can be routinely fabricated, or to even higher frequencies where transmitters and antennas are replaced by lasers, and receive circuitry is modified accordingly. This high frequency circuitry is mentioned in Skolnik and described in detail in the references cited therein.

Beam spreading, of course, imposes no practical range limit upon laser radar, and such devices can be effective even from space. Laser radars can, however, fail to detect targets that monitor scan patterns and adjust flight paths accordingly because, as noted in Skolnik, beam coverage and/or scan repetition rates are compromised by extremely narrow beams. The coverage problem can, however, be addressed without compromising the range advantage by artificially broadening the beam, say by bouncing it off a vibrating mirror, or preferably by clustering lasers of different frequencies, the beams of which are preset to deviate from parallel just enough so that the distance between beams is somewhat less than the smallest principal dimension of the targets when the targets are at their maximum expected ranges, or adjusted to this deviation from parallel as a variable of operation.

Returning now to FIG. 2, the relative sizes and proximities of searchcraft, stealthcraft, and antenna baselines have been exaggerated for purposes of clarity of illustration, the actual beams, say those corresponding to 264A and 264B, becoming almost parallel at ranges of just a few miles, so that small errors in measuring angles result in large errors in range unless the antennas of this invention, shown separated by the fuselage length of the searchcraft in the drawing, are actually separated by distances that are realizable only on large ships, or on land. When the errors due to this near-parallelism become intolerable, range is preferably determined by applying the laws of similar triangles.

In FIG. 2, for example, two such triangles are those that meet at stealthcraft 270, the upper triangle being made similar to the lower by substituting for line 262 line 259, the line that originates at the pivot point for beam 264B, terminates at beam 264A, and is parallel to the horizon and to line 272. The length of line 259 can be calculated by trigonometry because side 262 and the angles 263 and 265B are known, and because this calculation is less sensitive to small errors in measuring angles, the range calculation is less sensitive as well, so that for a first approximation when searchcraft 260 is in level flight over level terrain, line 259 is reasonably approximated by baseline 262.

Returning again to FIG. 1, and recalling that transmitter 115A is preferably operated at a frequency distinguishably different from that of transmitter 115B, it becomes clear that the details of dark patch 271A that are available from background image comparitor 148A are not available from background image comparitor 148B, nor vice versa with respect to dark patch 271B, and that these separate images must be combined to learn the details of background baseline 272 needed to calculate the range of stealthcraft 270.

In the preferred embodiment of FIG. 1, these images, available separately from background image comparitors 148A and 148B, are combined in proper registration by background image combiner 149, preferably a computer or portion thereof that effects registration on the basis of common image portions that are the result of beams illuminating common background patches. This patch commonality is confirmed on the basis of information supplied to background image combiner 149 by antenna orientation coordinator 114, transmit signal encoder 117, and, of course, background image comparitors 148A and 148B.

This combined image provides the additional information, the length of background baseline 272, needed to calculate the range of stealthcraft 270 by trigonometry from the triangle including that baseline, by the laws of similar triangles, or both. This range data is calculated by background image comparitor 149, and is made available for presentation by display 130, as are the combined background images. Here too, returns processed by the "A" suffixed stealthfinder blocks of FIG. 1 but not confirmed by the "B" blocks are either used to refine the search pattern or ignored.

As FIG. 1 makes clear, the preferred radar and sonar embodiments of this invention are dual with respect to transmit and receive portions, and are so because, using FIG. 2 as example, stealthcraft 270 anywhere along beam 264A would produce the same dark patch 271A, so that the only universally viable option for targets that absorb beams and cannot be ranged by timing reflections is triangulation, and triangulation, of course, requires two beams. There are, however, special situations that can be served by a single beam because stealthcraft altitude or course and speed are known, because targets move so slowly that successive scans by a moving searchcraft accommodate triangulation, or because, in the particular application, actual range is a matter of indifference. Some of these special situations are shown in FIG. 3, the radars for which might, for example, be embodiments of FIG. 1 in which the beams are steered independently, newly designed FIG. 4 embodiments, or conventional radars reworked to include at least the additional blocks 142A, 144A, 146A, and 148A of FIG. 1, or their functional equivalents.

Figure 3:
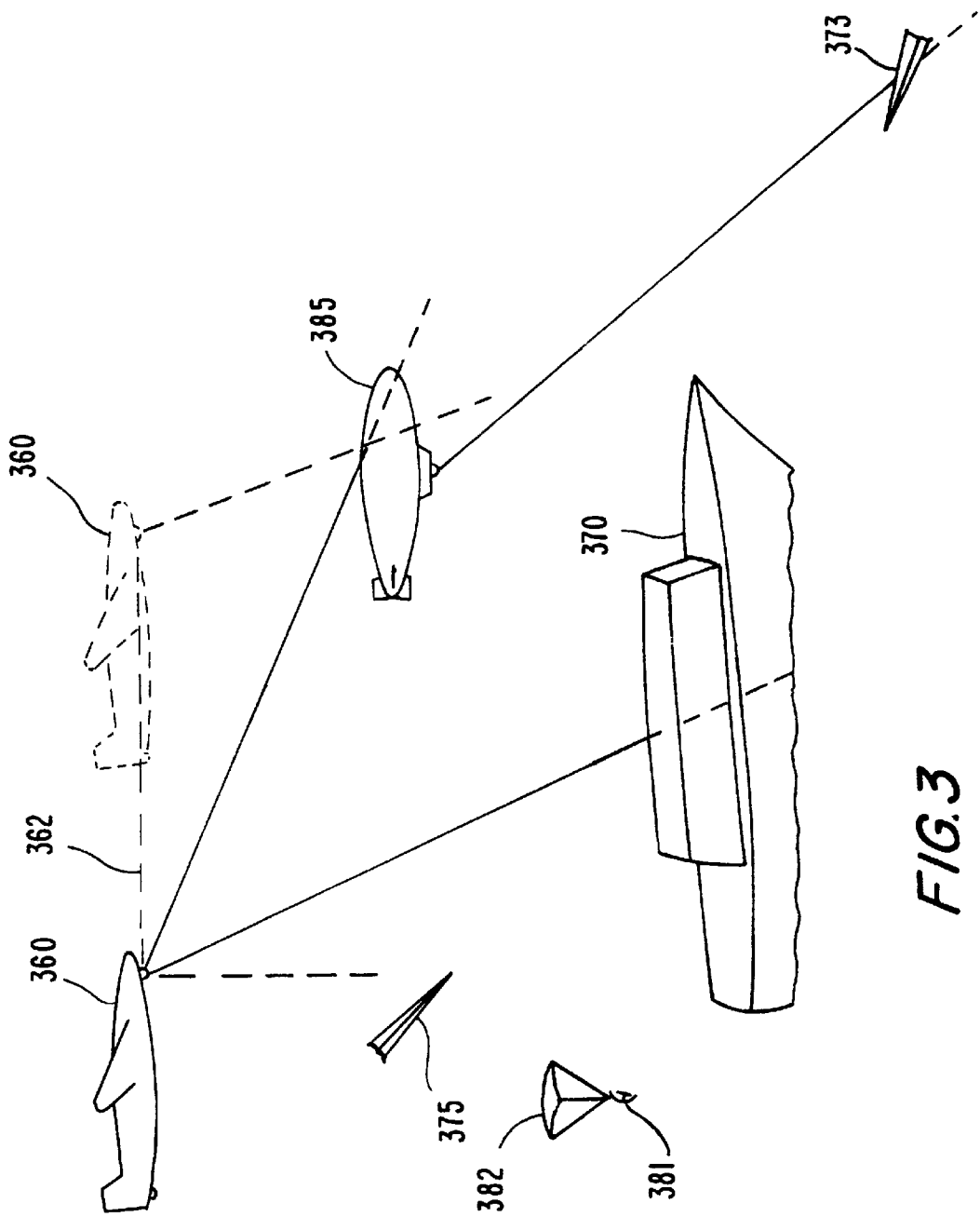
FIG. 3 is a pictorial representation of some of the radar applications of the present invention that can be served by a single beam.

With reference now to FIG. 3, one such stealth-modified target is ship 370, appearing as a dark patch in the background image on the screen of the stealthfinder radar aboard searchcraft 360. Because ship 370 is on the surface of the sea, its altitude is obviously known, and its range can be calculated from the right triangle that includes the altitude of the searchcraft, the target range, and the angle between.

Once found, ship 370 becomes the target for two weapons of destruction, one a sea-skimming stealth-modified cruise missile 373, and the other a stealth-modified missile 375 launched from searchcraft 360. For missile 375, the range to its target, ship 370, is a matter of indifference, and a single-beam radar in accordance with this invention can be used to steer missile 375 to the dark patch in the sea-glint pattern that is, of course, ship 370.

Missile 375, however, is a target the destruction of which is of prime importance to ship 370, and even if that ship did not carry stealthfinder radar in accordance with this invention, it could certainly detect radar transmissions from the missile and attack it on that basis, so that the homing radar of missile 375 is preferably operated as if it were the receiver portion of a bistatic pair, the transmit portion being the transmitter(s) of searchcraft 360.

Stealth maintenance is somewhat more complicated for missile 373, however, because at sea-skimming altitudes the dark patch in the sea glint produced by the transmitter(s) of searchcraft 360 that is the stealth-modified ship 370 might not be discernable as such by the receive equipment aboard missile 373, and at altitudes at which these dark patches are so discernable, the stealth advantage inherent in a sea-skimming approach is lost. In the embodiment of FIG. 3, the benefits of both bistatic radar and the sea-skimming approach are preserved with respect to stealth missile 373 by radar flare 381 that is a broad-beam transmitter suspended from parachute 382 as shown, and is buoyant or is fitted with a device to make it so.

In the battle scene of FIG. 3, ship 370 is shown protected by stealth-modified blimp 385 that can effectively detect and range missile 373 with a single-beam stealthfinder radar because that missile cruises at approximately sea level. Blimp 385 itself, however, can be both detected and ranged by a single beam from the stealthfinder radar aboard searchcraft 360 despite the fact that the blimp is not at sea level, because the blimp moves so slowly with respect to searchcraft 360 that it appears to remain stationary while a baseline 362 that can be used for rangefinding by triangulation is generated by the motion of the searchcraft.

While the detection and ranging of stealth-modified blimp 385 using a single beam from the radar aboard searchcraft 360 has been explained, the preferred radar aboard that searchcraft is, of course, the dual-beam embodiment of FIG. 1 that also accommodates detection and ranging as explained for the embodiment of FIG. 2. When the searchcraft is a satellite and the targets are on or near the surface of the earth, however, the longest baseline aboard the searchcraft may be too short for effective range calculation even with dual beam laser radar, and the Notionally generated baseline corresponding to 362 of FIG. 3 is an effective alternative.

Single beams, say the beam 264A of FIG. 2, can also be used to track targets previously detected and ranged by dual beams.

Stealthcraft maneuverability is limited not only by the design of these craft, but also because certain maneuvers reveal target positions in other ways, so that pilots believing themselves to be invisible to radar will maintain a course and speed that can be confirmed by adjusting searchcraft antenna orientation and transmission in such a way that a predetermined portion of the transmission, say a group of pulses, will either be absorbed or returned out of sequence if the target is where expected.

Figure 4:
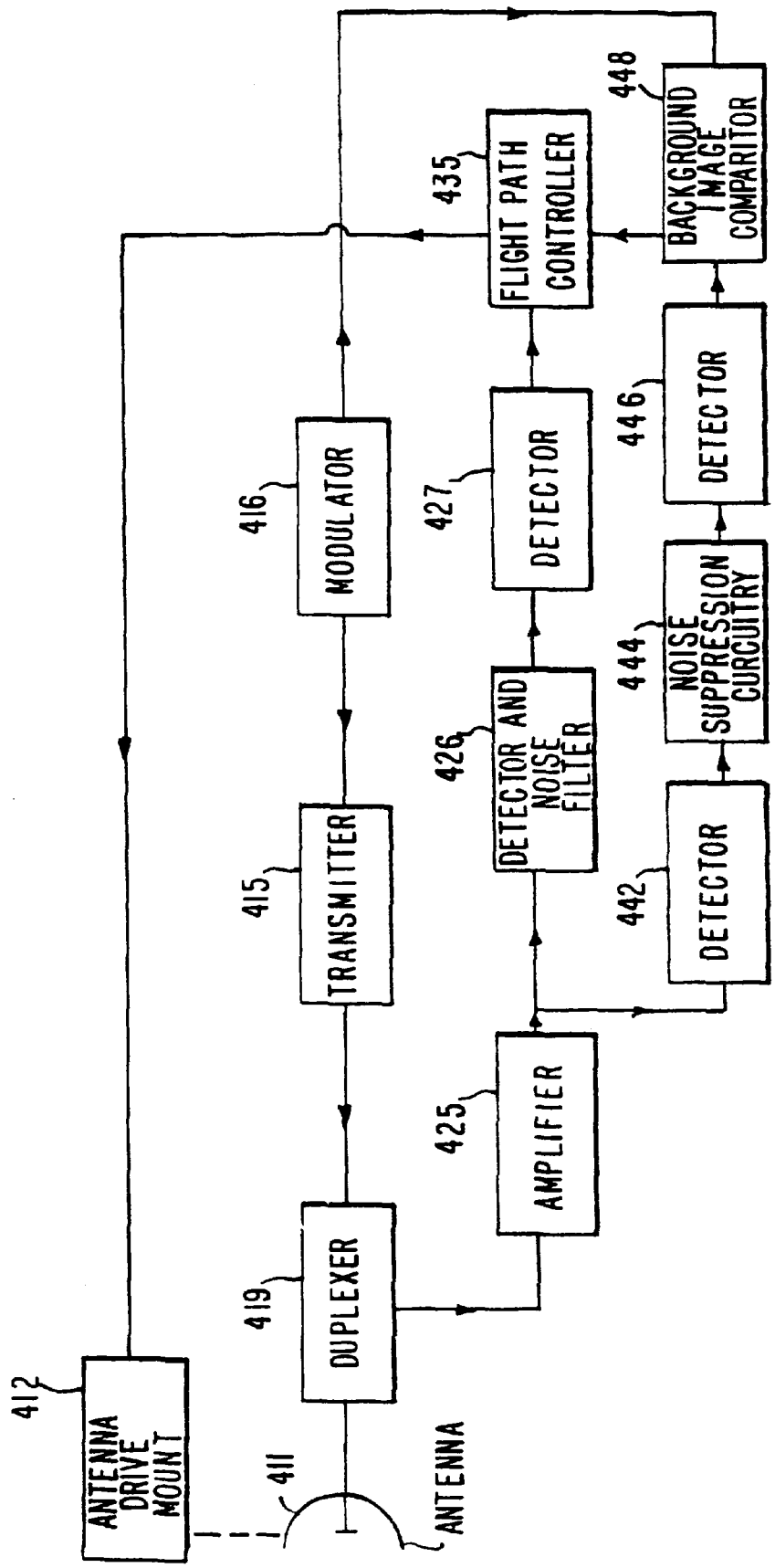
FIG. 4 is a block diagram of the preferred single-beam radar and sonar embodiments of the present invention for use aboard missiles.

The radar embodiment of FIG. 4 is the preferred radar for the missiles 373 and 375 of FIG. 3, and its sonar embodiment is the preferred sonar for the torpedo-like missiles 573 and 575 of FIG. 5. Most of the blocks of FIG. 4 are now familiar from FIG. 1.

Thus, assuming the embodiment of FIG. 4 to be a radar, 411 is the antenna, 415 the transmitter, 416 the modulator, 425 the low noise amplifier, 426 the first detector and noise filter and 427 the second detector, these blocks comprising a conventional radar much like the corresponding "A" suffixed blocks of FIG. 1. The transmit and receive portions of FIG. 4 are shown sharing a common antenna, however, and duplexer 419 has been introduced to protect the receive elements from the damaging effects of the high output levels of the transmitter.

The blocks 442, 444, 446, and 448 are also FIG. 4 counterparts of FIG. 1, corresponding to FIG. 1 blocks 142A, 144A, 146A, and 148A respectively, so that the embodiment of FIG. 4 is substantially half of an embodiment of FIG. 1. Because the embodiments of FIG. 4 are single-beam radars or sonars that guide missiles to their targets, however, blocks corresponding to 128, 147 and 149 of FIG. 1 have been omitted as has the display, and the outputs of blocks 427 and 448 are fed directly to missile flightpath controller 435. Controller 435 also steers antenna drive mount 412 so that the antenna can scan the target and its background, and the radar can supply course correction information to missile flightpath controller 435.

The radar and sonar embodiments of FIG. 4 preferably have both conventional and stealth capability as do those of FIG. 1 as shown, not only because the exact nature of a target cannot be known a priori, or because, at the present stage of development, stealth-modified targets are still measurably reflective, but also because some applications will be best served on the basis of target reflections. These FIG. 4 embodiments also include transmitters, the returns from which are one way to home in on stealth-modified targets, and, in this mode of operation, background returns are distinguished from those from clutter by comparing returns with suitably delayed signals from modulator 416, the block corresponding to transmit signal encoder 117 of FIG. 1 having been omitted from FIG. 4. While the signals from transmitter 415 can be used to home in on targets as explained, they can also be used by targets to find, track, and kill missiles, so that the preferred mode of operation of the FIG. 4 embodiments is bistatic, the transmitters being rendered inoperative, say by a switch (not shown), the missiles homing in on conventional target reflections from transmitters mounted elsewhere, or on target-produced dark patches or silhouettes from such transmitters, as explained in the descriptions of FIGS. 3 and 5.

The radar techniques used to find and track targets on or above the sea and illustrated by FIGS. 2 and 3 are, of course, directly applicable to targets such as tanks, helicopters, terrain-hugging stealthcraft, etc. on or above land, but are not as directly applicable to underwater targets such as stealth-modified submarine 570 of FIG. 5, because the electromagnetic waves used to detect and range targets in air do not propagate well in water, and acoustic waves and sonar techniques are used instead.

Submarines, once quite detectable with active or passive sonars because they were noisy, acoustically reflective, and limited with respect to dive depth and range, have been so improved that they can now cruise under arctic ice and under thermoclines, hide in sea canyons, etc., and are not only quiet at rest or in motion, but have also been modified to absorb rather than reflect the acoustic beams intended to find them. Again, however, like the radar targets previously described, the better they are at absorbing the beams intended to find them, the more vulnerable they are to the stealthcraft detection and ranging processes of this invention.

In FIG. 5, a stealth-modified submarine 570 is shown being detected and ranged by one dual-beam sonar embodiment of FIG. 1 on the sea floor, and another on a towed paravane 560, the towline and towcraft for which have been omitted from the drawing. The sonar analogs of radar antennas are transducers, and the transducers for the sea-floor-based sonar of FIG. 5 are mounted on sea-floor transducer mounts 512A and 512B that are the sonar analogs of antenna mounts 112A and 112B of FIG. 1.

In FIG. 5, the transducers on transducer mounts 512A and 512B produce the beams 568A and 568B that acoustically illuminate reflective background 578 that here is a density anomaly resulting from say a change in temperature or salinity, but might alternately be arctic ice, etc. These beams impinge upon and are absorbed by target 570, the result being the dark patches 576A and 576B shown. Again, target bearing and range is calculated by triangulation, here from the triangle that includes baseline 567, the distance between the effective pivot points of the beams, and the angles 569A and 569B that beams 568A and 568B make with this baseline, from the triangle that includes baseline 577 that is the distance between dark patches 576A and 576B, or by applying the laws of similarity to this pair of triangles.

Bearing and range are similarly calculated from the paravane beams 564A and 564B that acoustically illuminate the sea floor. Here too, these beams, like their radar analogs, must be narrow enough so that targets can be detected by changes in background illumination, and beam frequencies must be those for which these backgrounds are reflective, so that some sonar applications will, like their radar analogs, be best served in these respects by mechanically, electronically, or both mechanically and electronically steered distributed transducer arrays.

The sonars of FIG. 5 that have been described thus far are the analogs of the radars of FIG. 2, and, like these radars, betray their presence by the beams that they transmit. In FIG. 3, however, the missiles 373 and 375 maintain stealth because they are parts of bistatic radar systems the transmitters for which are located elsewhere, and their FIG. 5 analogs, the torpedo-like anti-ship/anti-submarine missiles 573 and 575 maintain stealth in the same way. Thus missile 575 is shown homing in on submarine 570 silhouetted by illumination of background 578 by the sea-floor-based sonar, and missile 573 homes in on the same target that is the silhouette in the illumination pattern produced by sonar "flare" 581 that is preferably an acoustic radiator operating at the same frequency as the sonar receiver aboard missile 573, but might alternately be a collection of charges preferably detonated underwater for this or other purposes. Missiles 573 and 575 can, of course, also be targeted against surface vessels, and workers of ordinary skill in the art will recognize that the appropriate reflective background for such targets is the air-water interface, and that the sonar flare or its equivalent must be at or near that interface. These workers will also recognize that differences between radars and sonars familiar from the prior art have been omitted from the descriptions herein, and will address these differences using known techniques when practicing this invention.

The new and novel features of this invention have now been disclosed, and two presently preferred embodiments, one a dual-beam configuration for detecting and ranging both stealth-modified and targets, and the other a single-beam configuration for special applications have been described, along with some of their applications. These descriptions are intended to be illustrative of the present invention, and not to limit its scope.

Thus the term "radar" as used here is intended to cover all those portions of the electromagnetic spectrum to which the new and novel features of this invention can be applied, including not only those in or near the visible portions of that spectrum and for which transmit and receive "antennas" and their associated circuitry are quite different from the parabolic reflectors and their associated circuitry implied by the antenna symbols in FIGS. 1 and 4, but also radar alternatives to sonar (perhaps using blue-green lasers, the beams from which are known to penetrate sea water and are presently being considered for use as a communication link between aircraft and submarines). By analogy, this disclosure also applies to sonar-like applications in which air is the wave propogation medium. Workers of ordinary skill in the art will recognize the changes in circuitry needed to serve these applications, and will effect these changes when practicing this invention.

I claim:

1. An apparatus for detecting both stealth-modified and conventional targets where background returns are detectable, and comprising:

(a) means for producing a first steerable narrow beam, (b) means for receiving the returns from said first steerable narrow beam, (c) sequence dependent distinguishing means for distinguishing the background returns from said first steerable narrow beam from the returns from said targets, (d) means for constructing background images from said background returns, and (e) means for finding the dark patches in said background images that result when said first steerable narrow beam is at least one of absorbed, reflected and refracted by said targets.

2. The apparatus of claim 1 and further comprising:

(a) means for producing a second independently steerable narrow beam whose returns are distinguishable from those of said first steerable narrow beam, (b) means for steering said second steerable narrow beam for scanning at least part of the length of said first beam, (c) means for receiving the returns from said second steerable narrow beam, (d) further sequence dependent distinguishing means for distinguishing the background returns from said second steerable narrow beam from the target returns therefrom, and (e) means for confirming the presence of said targets when said first and said second steerable narrow beams intersect at said targets.

3. The apparatus of claim 2 and further comprising means for calculating the range of said targets when said first and said second steerable narrow beams intersect at said targets.

4. The apparatus of claim 2 wherein said sequence dependent distinguishing means and said further sequence dependent distinguishing means each comprise:

(a) means for coding the transmitted signals for permitting recognition of the transmission sequence of said transmitted signals, (b) means for temporarily storing replicas of at least the sequence-recognizable portions of said transmitted signals, (c) means for comparing at least the sequence-recognizable portions of said background returns and said target returns with said temporarily stored replicas of said sequence-recognizable portions of said transmitted signals, and (d) means for distinguishing said background returns from said target returns on the basis of the sequence of said returns.

5. The apparatus of claim 1 and further comprising:

(a) means for producing a second independently steerable narrow beam whose returns are distinguishable from those of said first steerable narrow beam, (b) means for steering said second steerable narrow beam for scanning at least a part of the length of said first steerable narrow beam, (c) means for receiving the returns from said second steerable narrow beam, (d) additional sequence dependent distinguishing means for distinguishing the background returns from said second steerable narrow beam from the target returns therefrom, (e) means for constructing background images from the background returns from said second steerable narrow beam, (f) means for finding the dark patches in said background images that result when said second steerable narrow beam is at least one of absorbed, reflected, and refracted by said targets, (g) means for finding the distances between the corresponding dark patches in said background images that result when said first and said second steerable narrow beams intersect at and are at least one of absorbed, reflected, and refracted by said targets, and (h) means for calculating the range of said targets by at least one of triangulation and the laws of similar triangles.

6. The apparatus of claim 5 wherein said means for constructing and for combining said background images, for finding said dark patches, and for calculating the range of said targets are computers or portions thereof.

7. The apparatus of claim 5 wherein said sequence dependent distinguishing means and said additional sequence dependent distinguishing means each comprise:

(a) means for coding the transmitted signals for permitting recognition of the transmission sequence of said transmitted signals, (b) means for temporarily storing replicas of at least the sequence-recognizable portions of said transmitted signals, (c) means for comparing at least the sequence-recognizable portions of said background returns and said target returns with said temporarily stored replicas of said sequence-recognizable portions of said transmitted signals, and (d) means for distinguishing said background returns from said target returns on the basis of the sequence of said returns.

8. The apparatus of claim 1 wherein said means for producing said first steerable narrow beam is at least one laser.

9. The apparatus of claim 1 wherein said means for producing said first steerable narrow beam is a narrow beam radar antenna.

10. The apparatus of claim 1 wherein at least a portion of said means for producing said first steerable narrow beam is at least one element of a distributed antenna array.

11. The apparatus of claim 1 wherein said means for producing said first steerable narrow beam is at least one sonar transducer.

12. The apparatus of claim 1 wherein at least a portion of said means for producing said first steerable narrow beam is at least one element of a distributed transducer array.

13. The apparatus of claim 1 and further comprising:

(a) further sequence dependent distinguishing means for distinguishing returns from said targets from background returns, (b) means for detecting said targets from said returns from said targets, and (c) means for calculating the range of said targets from said returns from said targets.

14. The apparatus of claim 1 wherein said sequence dependent distinguishing means comprises:

(a) means for coding the transmitted signals for permitting recognition of the transmission sequence of said transmitted signals, (b) means for temporarily storing replicas of at least the sequence-recognizable portions of said transmitted signals, (c) means for comparing at least the sequence-recognizable portions of said background returns and said target returns with said temporarily stored replicas of said sequence-recognizable portions of said transmitted signals, and (d) means for distinguishing said background returns from said target returns on the basis of the sequence of said returns.

15. A process for confirming detection of conventional radar and sonar targets from target returns, and comprising:

(a) scanning a target area by transmitting a first coded beam, (b) scanning the target area by transmitting a second coded beam that scans at least a portion of, and produces returns distinguishably different from, those from said first coded beam, (c) receiving the returns from said first and said second coded beams, (d) comparing the codes of said returns with suitably delayed replicas of the codes of the signals transmitted to find target-return pairs corresponding to points of intersection of said first and said second coded beams, and (e) confirming the detection of said targets from said target-return pairs.

* * * * *